United States Patent [19]

Wilhelm et al.

[11] Patent Number: 4,671,326
[45] Date of Patent: Jun. 9, 1987

[54] DUAL SEAL NOZZLE DAM AND ALIGNMENT MEANS THEREFOR

[75] Inventors: John J. Wilhelm, New Kensington; Robert D. Burack, Pleasant Hills; Fredrick J. Klorcyzk, Greensburg; Thomas J. Crossley, Pittsburgh, all of Pa.

[73] Assignee: Westinghouse Electric Corp., Pittsburgh, Pa.

[21] Appl. No.: 651,419

[22] Filed: Sep. 17, 1984

[51] Int. Cl.⁴ ............................................. F16L 55/12
[52] U.S. Cl. ....................................... 138/93; 376/204
[58] Field of Search ..................... 138/89, 93; 220/232; 376/204

[56] References Cited

U.S. PATENT DOCUMENTS

| | | | |
|---|---|---|---|
| 1,851,939 | 3/1932 | Williams | 138/89 |
| 3,031,357 | 4/1962 | Balkin et al. | 156/189 |
| 3,269,735 | 8/1966 | Whittaker | 277/22 |
| 3,561,776 | 2/1971 | Wilson | 277/206 R |
| 4,100,019 | 7/1978 | Groff et al. | 376/204 |
| 4,235,674 | 11/1980 | Yue | 376/203 |
| 4,238,291 | 12/1980 | Neuenfeldt et al. | 376/285 |
| 4,355,000 | 10/1982 | Lumelleau | 376/205 |
| 4,483,457 | 11/1984 | Schuker | 138/93 X |
| 4,518,015 | 5/1985 | Fischer | 138/93 |

FOREIGN PATENT DOCUMENTS

| | | |
|---|---|---|
| 170286 | 2/1905 | Fed. Rep. of Germany . |
| 7504076 | 4/1975 | Netherlands . |
| 826429 | 1/1960 | United Kingdom . |

*Primary Examiner*—Stephen Marcus
*Assistant Examiner*—Maric Thronson
*Attorney, Agent, or Firm*—L. A. DePaul

[57] ABSTRACT

A nozzle dam for providing a fluid-tight seal across a primary fluid nozzle in the plenum of a nuclear steam generating vessel includes two fluid-impermeable seals, each comprising a circular three-section foldable seal plate covered with a flexible diaphragm and circumferentially encompassed by an inflatable seal member disposable in frictional sealing engagement with the inner surface of the nozzle. The two seal apparatuses are interconnected by a central tubular coupling coaxial with the nozzle and non-rotatably fixed to each seal, the coupling having a quick-disconnect feature operable from outside the nozzle dam. The coupling provides a conduit for inflation of one of the seals. The two seals are also interconnected by four post assemblies to maintain the seal plates parallel with each other, each post assembly including a cylindrical member pivotally movable between a release position and a supporting position, and provided with a slidable encompassing sleeve to lock it in the supporting position. Structure is provided for pressurizing the inter-seal space and monitoring the pressure in that space.

18 Claims, 7 Drawing Figures

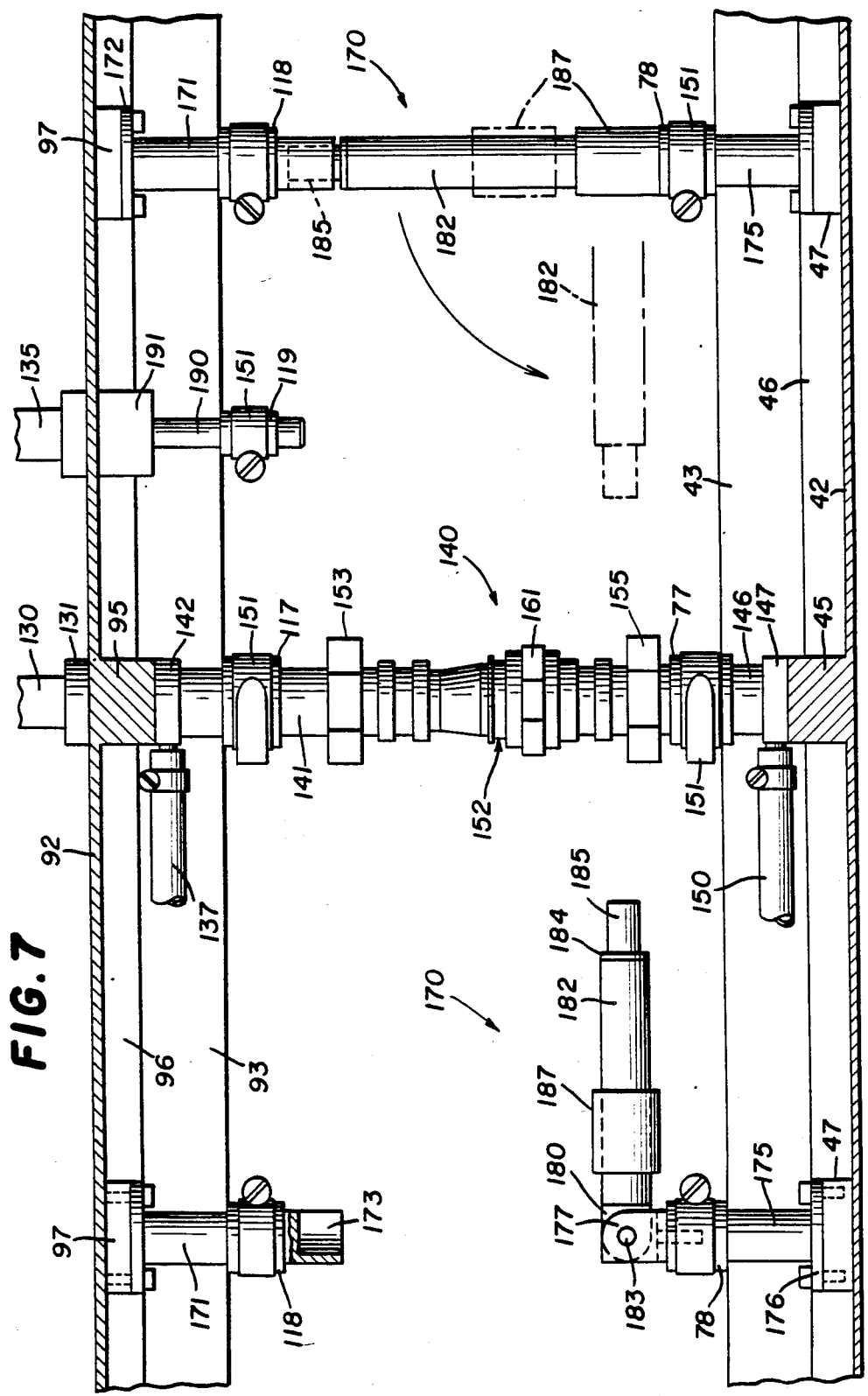

DUAL SEAL NOZZLE DAM AND ALIGNMENT MEANS THEREFOR

BACKGROUND OF THE INVENTION

The present invention relates to devices for providing a fluid-tight seal or block in a tubular member such as a conduit or nozzle or the like. The invention has particular application to providing a dam or seal in the primary fluid nozzles of a nuclear steam generator.

A typical nuclear steam generator comprises a vertically oriented shell or vessel. A tube sheet toward the lower end of the vessel supports a tube bundle comprising a plurality of tubes, each generally in the shape of an inverted U. The portion of the vessel beneath the tube sheet is divided by a partition into inlet and outlet plenums which are respectively disposed immediately beneath the vertical legs of the tube bundle. The vessel is provided with primary fluid inlet and outlet nozzles, respectively communicating with the plenums, each nozzle projecting outwardly of the vessel and commonly having a frustoconical portion and a circularly cylindrical portion. The nozzles are connected by conduits to an associated nuclear reactor vessel.

Primary fluid, having been heated by circulation through the reactor, enters the steam generator vessel through the primary inlet nozzle to the inlet plenum and from there flows upwardly through the tube bundle to the outlet plenum and then back through the outlet nozzle to the reactor core. The tube bundle above the tube sheet is immersed in a secondary fluid, such as water, the tube bundle serving as a heat exchanger for converting the secondary water to steam, which is then used for generating electricity in the usual manner.

Periodically, it is necessary to shut down the reactor for refueling. This is usually a convenient time for servicing the nuclear steam generator. In this regard, the reactor is drained to below the level of the inlet and outlet nozzles of the steam generator vessel. The tube bundle and inlet and outlet plena are also drained and dams are then installed in the inlet and outlet nozzles to block them. The steam generating vessel can then be treated in a chemical decontamination procedure without contaminating the primary fluid conduits and the nuclear reactor.

Heretofore, a number of different types of fixed or static nozzle dams have been utilized. Most of these dams involve permanent modification of the nozzle, either by drilling of holes therein or the mounting of attachment structure thereon, these techniques entailing man-rem exposure and affecting the flow of primary fluid through the nozzle. It is also known to utilize expandable bags or diaphragms or the like which are inserted in the nozzle and expanded to plug the nozzle. But such prior expandable seals do not adhere particularly well to the nozzle inner surface.

One type of nozzle dam, utilized by Westinghouse Electric Corporation, involves the use of one or more seal assemblies, each including a foldable circular seal plate encircled with an inflatable seal which is disposable in frictional engagement with the nozzle wall. Certain embodiments of this type of seal are disclosed in the copending U.S. application of John J. Wilhelm, Paul H. Dawson, Arthur W. Kramer and Gregory L. Calhoun, U.S. Pat. Ser. No. 605,354, filed Apr. 30. 1984 entitled NON-BOLTED RINGLESS NOZZLE DAM.

Another version of the Westinghouse nozzle dam incorporates two or more of the circular foldable seal assemblies, interconnected by a central tubular coupling, incorporating a quick-disconnect which is operable from outside the seal assemblies. The coupling is threadedly engaged with each of the two interconnected seal assemblies. While this arrangement operates well in most applications, any torque on either of the two seal assemblies tends to cause relative rotation of the seal assemblies, resulting in unscrewing of the coupling and attendant loosening of the seal. Such loosening results in excessive leakage.

Furthermore, the seal assemblies of this arrangement could move as a result of pressure changes on opposite sides thereof, improper seating and the like and, as a result of such movement, the two seal assemblies may not stay parallel, which also would result in poor sealing and resultant leakage. Furthermore, this non-parallel condition could cause the center tubular coupling to be bent, which would interfere with the operation of the quick disconnect mechanism.

SUMMARY OF THE INVENTION

It is a general object of the present invention to provide an improved means for sealing the primary fluid nozzles of a nuclear steam generating vessel, which means avoids the disadvantages of prior sealing arrangements, while affording additional structural and operating advantages.

An important object of the present invention is the provision of a nozzle dam comprising dual seals which can be maintained in an accurately-seated substantially leak-free mounted condition.

In connection with the foregoing object, it is another object of this invention to provide a nozzle dam of the type set forth, wherein the spacing between the two seals is accurately maintained.

Still another object of the invention is the provision of a nozzle dam of the type set forth, wherein the two seals are effectively restrained against relative rotation about the nozzle axis.

Another object of the invention is the provision of a nozzle dam of the type set forth, wherein the two seals are maintained in a parallel relationship normal to the nozzle axis.

Yet another object of the invention is the provision of a nozzle dam of the type set forth, wherein detection of leakage is facilitated.

It is another object of the invention to provide a nozzle dam which permits chemical decontamination of the steam generating vessel.

These and other objects of the invention are attained by providing a nozzle dam for preventing fluid flow through a primary fluid nozzle in the plenum of a nuclear steam generating vessel, wherein the nozzle has an inner surface and an axis, the nozzle dam comprising: first and second fluid-impermeable seal means disposable in sealing conditions axially spaced-apart within the nozzle, each of the seal means in the sealing condition thereof extending across and closing the nozzle and frictionally engageable with the inner surface thereof around the entire perimeter thereof to form a fluid-tight seal, and coupling means nonrotatably fixed to each of the seal means for interconnecting same in the sealing conditions thereof to maintain a predetermined axial spacing therebetween while inhibiting relative rotation thereof about the axis of the nozzle.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is an enlarged, fragmentary view in vertical section taken along the line 7—7 in FIG. 2.

DESCRIPTION OF THE PREFERRED EMBODIMENT

Figure 1:
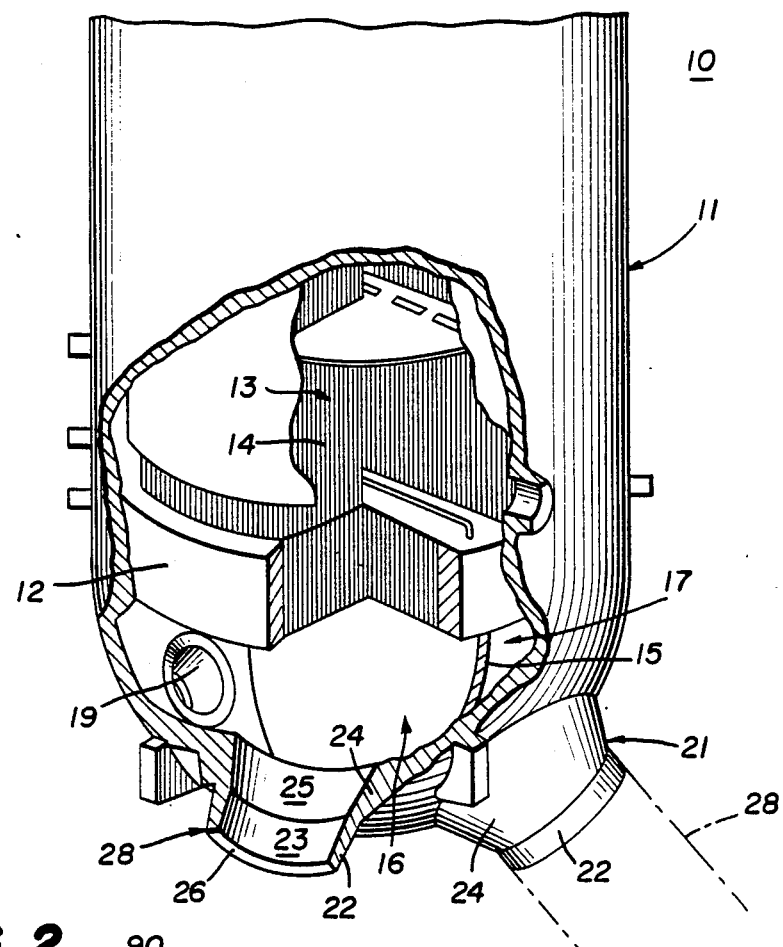
FIG. 1 is a fragmentary perspective view of the lower end of a nuclear steam generator vessel, with portions broken away more clearly to illustrate the inlet and outlet nozzles and a manway with which the present invention is used.

Referring to FIG. 1, there is illustrated a portion of a nuclear steam generator plant, generally designated by the numeral 10, including a vessel 11 having a generally part-spherical lower end which is separated from the upper end thereof by a horizontally disposed tube sheet 12. Mounted on the tube sheet 12 is a tube bundle 13, including a plurality of generally inverted U-shaped tubes 14, having the lower ends thereof disposed through complementary bores in the tube sheet 12. The portion of the vessel 11 below the tube sheet 12 is divided by a wall 15 into an inlet plenum 16 and an outlet plenum 17, which respectively communicate with the two vertical portions of the tubes 14. Formed in the vessel 11 are manways 19 (one shown) providing access to the inlet and outlet plenums 16 and 17. Also respectively communicating with the inlet and outlet plenums 16 and 17 and projecting outwardly from the vessel 11 are two nozzles 20 and 21, each having an outer cylindrical portion 22 having a cylindrical inner surface 23 and an inner frustoconical portion 24 having a frustoconical inner surface 25. The outer end of each of the nozzles 20 and 21 defines an annular end wall 26 which is adapted to be secured, as by a suitable weldment 27 (see FIG. 3), to an associated conduit 28 which extends to an associated nuclear reactor vessel (not shown).

In general, at least two types of nozzles are provided in existing steam generator vessels. One type has a relatively long cylindrical portion 22 and a relatively short frustoconical portion 24, this type being exemplified by the nozzle 20. Another type has a relatively short cylindrical portion 22 and a relatively long frustoconical portion 24, this type being exemplified by the nozzle 21. Normally, both of the nozzles on the vessel 11 will be of the same type, but both types have been shown in FIG. 1 for purposes of illustration.

Figure 2:
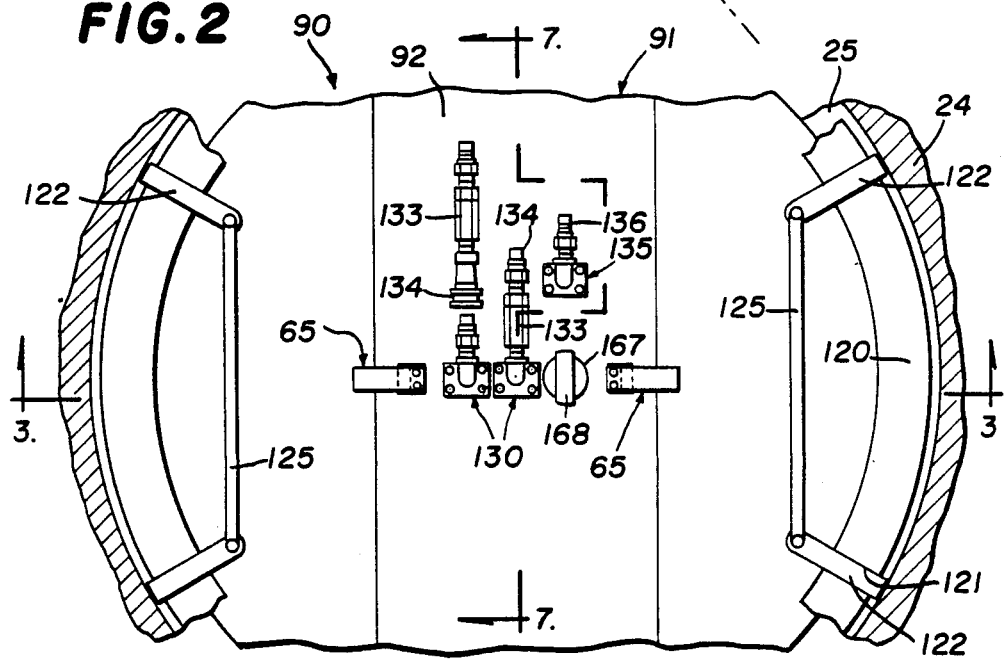
FIG. 2 is an enlarged, fragmentary, sectional view taken through one of the nozzles in FIG. 1 perpendicular to the nozzle axis, and illustrating the nozzle dam of the present invention in plan view.
Figure 3:
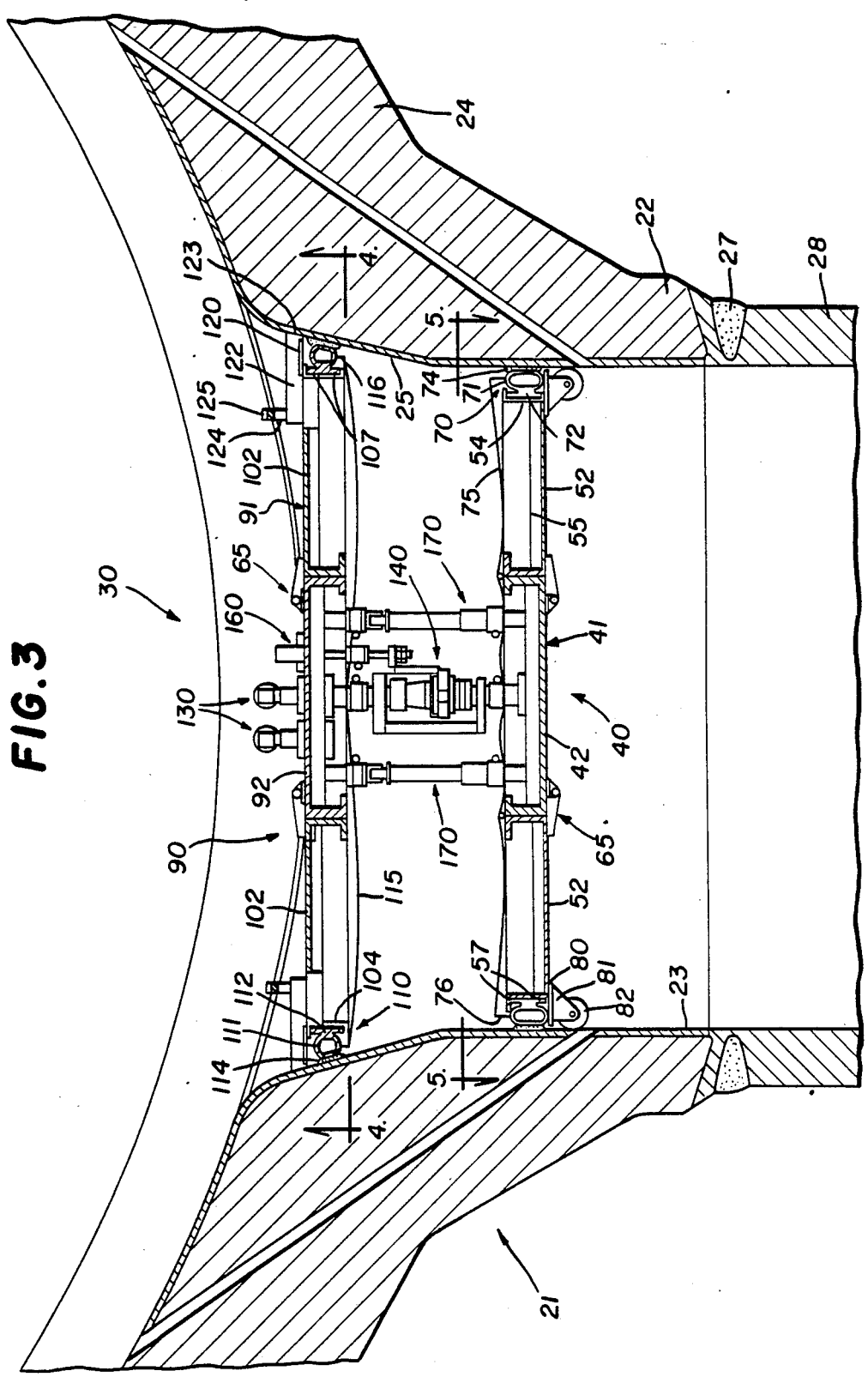
FIG. 3 is a further enlarged, fragmentary, sectional view taken along the line 3—3 in FIG. 2, showing the nozzle dam in its installed position.

Referring now to FIGS. 2 through 7 of the drawings, there is illustrated a nozzle dam, generally designated by the numeral 30, constructed in accordance with and embodying the features of the present invention. The nozzle dam 30 includes outer and inner seal assemblies 40 and 90, interconnected by a coupling assembly 140 and a plurality of support post assemblies 170. The nozzle dam 30 is adapted to be disposed in a nozzle 20 or 21, with the outer seal assembly 40 closing the outer cylindrical portion 22 and with the inner seal assembly 90 closing the inner frustoconical portion 24, as is best illustrated in FIG. 3. While, for purposes of illustration, the nozzle dam 30 has been shown in a nozzle of the type represented by the nozzle 20, it will be appreciated that it can also be used in nozzles of the type represented by the nozzle 21, in exactly the same manner.

Figure 5:
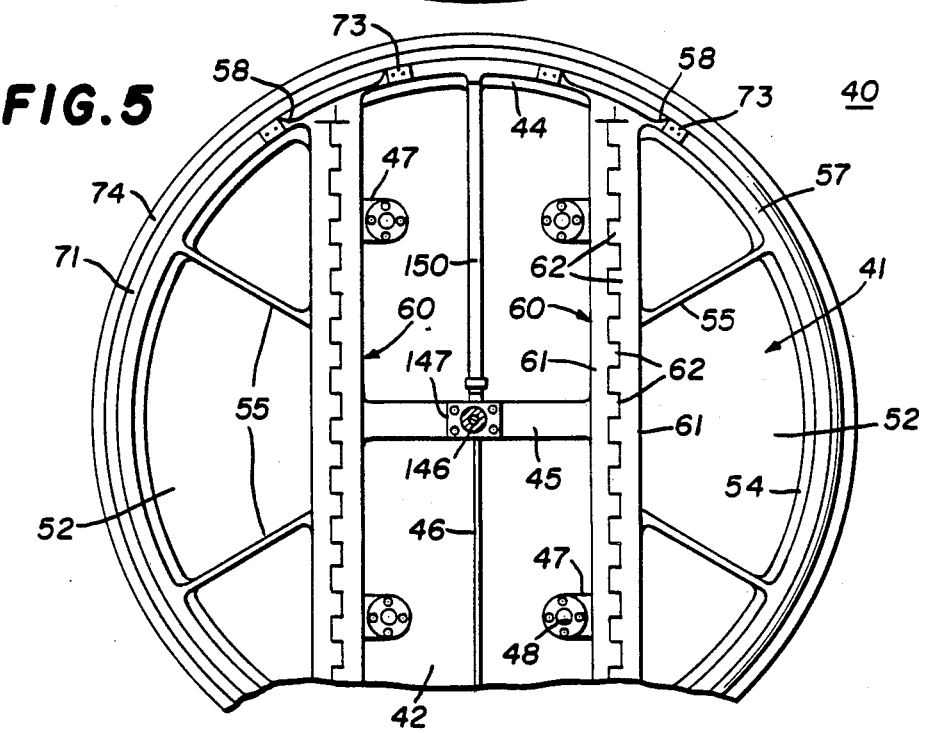
FIG. 5 is a fragmentary plan view of the outer seal of the nozzle dam of the present invention, taken along the line 5—5 in FIG. 3, with the diaphragm removed more clearly to show the seal structure.

The outer seal assembly 40 includes a foldable circular seal plate 41, having a center section 42 hingedly connected to two side sections 52. The center section 42 is provided with two parallel side walls 43 (FIG. 6), interconnected at their opposite ends by two arcuate end walls 44 (FIG. 5). Spanning the side walls 43 centrally thereof along the inner surface of the center section 42 is a transverse web 45, which intersects a longitudinal web 46 disposed perpendicular thereto and spanning the arcuate end walls 44. Integral with each of the side walls 43 and projecting laterally inwardly therefrom along the inner surface of the center section 42 are a pair of spaced-apart coupling blocks 47, each having a cylindrical socket 48 formed therein. Respectively formed in the outer surfaces of the side walls 43 are two seal grooves 49 (see FIG. 6), each extending substantially the entire length of the side wall 43 and having inturned end portions respectively adjacent to the opposite ends of the side wall 43. Respectively received in the seal grooves 49 are two resiliently compressible hinge seals 50. Each of the side walls 43 is provided at its inner distal edge with an integral attachment flange 51 projecting laterally inwardly therefrom substantially perpendicular thereto and extending along substantially the entire length thereof.

The two side sections 52 are substantially identical, so that only one will be described in detail. Each of the side sections 52 has an elongated straight side wall 53 (FIG. 6), the opposite ends of which are interconnected by an arcuate outer wall 54 (FIG. 3), the walls 53 and 54 being interconnected by a pair of radially-extending webs 55 (FIG. 5) along the inner surface of the side section 52. Integral with the side wall 53 along its inner edge and projecting laterally inwardly therefrom substantially perpendicular thereto is an attachment flange 56 (FIG. 6) extending substantially the entire length of the side wall 53.

As is best illustrated in FIGS. 2 and 5, the two side sections 52 are respectively disposed along opposite sides of the center section 42, with the side walls 53 respectively disposed for back-to-back mating engagement with the side walls 43 along parting planes which define parallel chords of the circular seal plate 41, when the seal plate 41 is disposed in its flat, unfolded sealing condition illustrated in the drawings. It will be appreciated that, in this condition, the arcuate end walls 44 of the center section 42 and the arcuate outer walls 54 of the side sections 52 cooperate to define a substantially continuous cylindrical wall extending around the entire circumference of the seal plate 41. Each of the arcuate end walls 44 and outer walls 54 is provided at its inner and outer edges with a pair of radially outwardly extending peripheral flanges 57 (see FIGS. 3 and 5), cutouts 58 being formed in the inner one of the flanges 57 adjacent to the ends of the side walls 43 and 53 (FIG. 5), for a purpose to be explained more fully below.

The center section 42 is connected, respectively, to the two side sections 52 by two hinge assemblies 60. Each of the hinge assemblies 60 comprises a piano-type hinge including a pair of hinge plates 61 (FIG. 5), respectively mounted on the attachment flanges 51 and 56 of the side walls 43 and 53. Each of the hinge plates 61 has a plurality of longitudinally spaced-apart aligned bushings 62, arranged so that the bushings of the two hinge plates 61 interleave for receiving therethrough an elongated hinge pin 63 (FIG. 6) to accommodate pivotal movement of the side sections 52 with respect to the center section 42 between a flat, unfolded sealing condition, illustrated in the drawings, and a folded position (not shown). With regard to its foldability, the seal plate 41 is substantially the same as that disclosed in the aforementioned copending U.S. application Ser. No. 605,354, reference to which may be had for a more detailed description of the folding and unfolding operation and the applicability thereof to installation of the nozzle dam 30.

Figure 6:
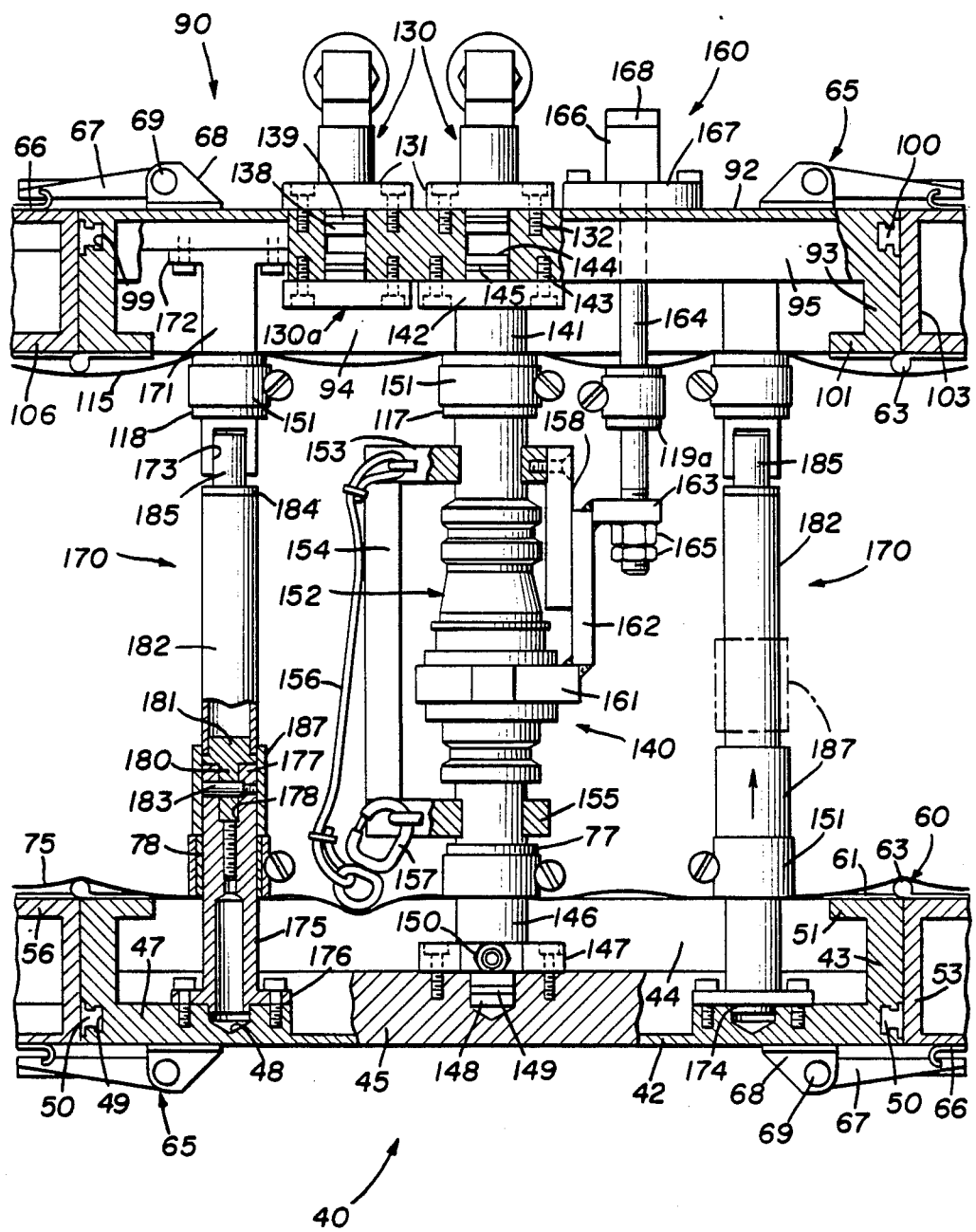
FIG. 6 is a further enlarged fragmentary view of the central portion of the nozzle dam illustrated in FIG. 3.

The seal plate 41 is held in its flat sealing condition by four latch assemblies 65 (FIGS. 2, 3 and 6). Each of the latch assemblies 65 includes a keeper 66 fixedly secured to the outer surface of the associated side section 52, and a latch member 67 pivotally mounted on a mounting bracket 68 which is secured to the outer surface of the center section 42, for pivotal movement into latching engagement with the associated keeper 66 about the axis of a pivot pin 69.

The seal assembly 40 also includes an inflatable seal 70 (FIGS. 3 and 5), including an inflatable bladder 71 extending generally circumferentially around the seal plate 41. The bladder 71 is provided with an attachment web 72 which is disposed between the peripheral flanges 57 and secured in place by clip angles 73 (FIG. 5) at the ends of each of the cutout portions 58. Fixedly secured to the bladder 71 and projecting radially outwardly therefrom around the entire circumference thereof is a seal member 74, formed of a compressible resilient material, such as EDPM. Upon inflation, the bladder 71 expands radially outwardly to drive the seal member 74 into frictional sealing engagement with the cylindrical inner surface 23 of the associated nozzle 20 or 21 (see FIG. 3).

A flexible circular diaphragm 75 covers the inner side of the seal plate 41, the diaphragm 75 being secured at its outer peripheral edge to a cylindrical attachment bracket 76 carried by the bladder 71 (FIG. 3). Integral with the diaphragm 75 and projecting inwardly therefrom are a central tubular bushing 77 and four surrounding bushings 78 (FIG. 6), respectively disposed for alignment with complementary apertures (not shown) through the center section 42 of the seal plate 41, for a purpose to be explained more fully below. Secured to the outer surface of the seal plate 41 and extending radially outwardly therefrom around the entire perimeter thereof is a flat annular seal guard 80 (FIG. 3) which overlies the bladder 71. Fixedly secured to the seal guard 80 at equiangularly spaced-apart locations thereon are a plurality of clevis brackets 81, each rotatably carrying a roller 82 to facilitate mounting of the seal assembly 40, as will be explained below.

Figure 4:
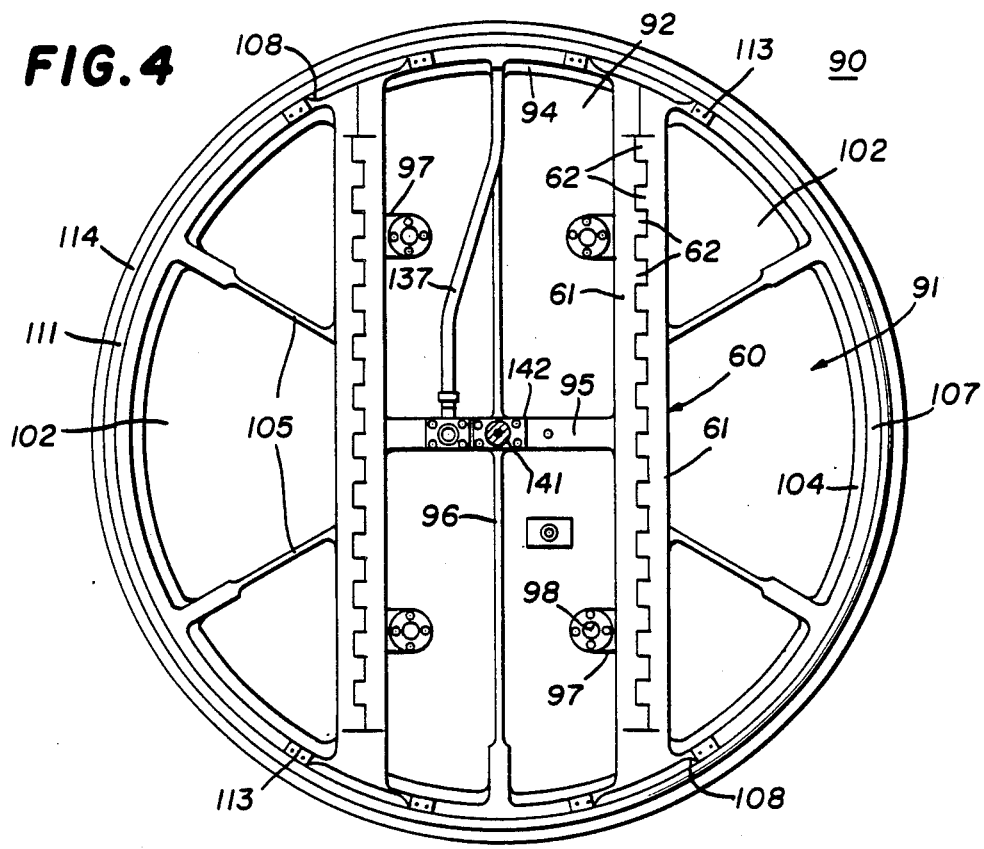
FIG. 4 is a bottom plan view of the inner seal of the nozzle dam of the present invention, taken along the line 4—4 in FIG. 3, with the diaphragm removed more clearly to show the seal structure.

The inner seal assembly 90 is similar to the seal assembly 40, but has a slightly larger diameter. More specifically, referring in particular to FIGS. 2, 3 and 4, the seal assembly 90 includes a foldable circular seal plate 91, having a center section 92 hingedly connected to two side sections 102. The center section 92 is provided with two parallel side walls 93 (FIG. 6), interconnected at their opposite ends by two arcuate end walls 94 (FIG. 4). Spanning the side walls 93 centrally thereof along the inner side of the center section 92 is a transverse web 95, which intersects a longitudinal web 96 disposed perpendicular thereto and spanning the arcuate end walls 94. Integral with each of the side walls 93 and projecting laterally inwardly therefrom along the inner surface of the center section 92 are a pair of spaced-apart coupling blocks 97, each having a cylindrical socket 98 formed therein. Respectively formed in the outer surfaces of the side walls 93 are two seal grooves 99 (see FIG. 6), each extending substantially the entire length of the side wall 93 and having inturned end portions respectively adjacent to the opposite ends of the side wall 93. Respectively received in the seal grooves 99 are two resiliently compressible hinge seals 100. Each of the side walls 93 is provided at its inner distal edge with an integral attachment flange 101 projecting laterally inwardly therefrom substantially perpendicular thereto and extending along substantially the entire length thereof.

The two side sections 102 are substantially identical, so that only one will be described in detail. Each of the side sections 102 has an elongated straight side wall 103 (FIG. 6), the opposite ends of which are interconnected by an arcuate outer wall 104 (FIG. 3), the walls 103 and 104 being interconnected by a pair of radially-extending webs 105 along the inner surface of the side section 102. Integral with the side wall 103 along its inner edge and projecting laterally inwardly therefrom substantially perpendicular thereto is an attachment flange 106 (FIG. 6) extending substantially the entire length of the side wall 103.

As is best illustrated in FIGS. 2 and 4, the two side sections 102 are respectively disposed along opposite sides of the center section 92, with the side walls 103 respectively disposed for back-to-back mating engagement with the side walls 93 along parting planes which define parallel chords of the circular seal plate 91, when the seal plate 91 is disposed in its flat, unfolded sealing condition illustrated in the drawings. It will be appreciated that, in this condition, the arcuate end walls 94 of the center section 92 and the arcuate outer walls 104 of the side sections 102 cooperate to define a substantially continuous cylindrical wall extending around the entire circumference of the seal plate 91. Each of the arcuate end walls 94 and outer walls 104 is provided at its inner and outer edges with a pair of radially outwardly extending peripheral flanges 107 (see FIGS. 3 and 4), cutouts 108 being formed in the inner one of the flanges 107 adjacent to the ends of the side walls 93 and 103 (FIG. 4), for a purpose to be explained more fully below.

The center section 92 is connected, respectively, to the two side sections 102 by two hinge assemblies 60. Each of the hinge assemblies 60 comprises a piano-type hinge including a pair of hinge plates 61 (FIG. 4), respectively mounted on the attachment flanges 101 and 106 of the side walls 93 and 103. Each of the hinge plates 61 has a plurality of longitudinally spaced-apart aligned bushings 62, arranged so that the bushings of the two hinge plates 61 interleave for receiving therethrough an elongated hinge pin 63 (FIG. 6) to accommodate pivotal movement of the side sections 102 with respect to the center section 92 between a flat, unfolded sealing condition, illustrated in the drawings, and a folded position (not shown). With regard to its foldability, the seal plate 91 is substantially the same as the seal plate 41, described above.

The seal plate 91 is held in its flat sealing condition by four latch assemblies 65 (FIGS. 2, 3 and 6). Each of the latch assemblies 65 includes a keeper 66 fixedly secured to the outer surface of the associated side section 102, and a latch member 67 pivotally mounted on a mounting bracket 68 which is secured to the outer surface of the center section 92, for pivotal movement into latching engagement with the associated keeper 66 about the axis of a pivot pin 69.

The seal assembly 90 also includes an inflatable seal 110 (FIGS. 3 and 4), including an inflatable bladder 111 extending generally circumferentially around the seal plate 91. The bladder 111 is provided with an attachment web 112 which is disposed between the peripheral flanges 107 and secured in place by clip angles 113 (FIG. 4) at the ends of each of the cutout portions 108. Fixedly secured to the bladder 111 and projecting radially outwardly therefrom around the entire circumference thereof is a seal member 114, formed of a compressible resilient material, such as EDPM. Upon inflation, the bladder 111 expands radially outwardly to drive the seal member 114 into frictional sealing engagement with the cylindrical inner surface 23 of the associated nozzle 20 or 21 (see FIG. 3).

A flexible circular diaphragm 115 covers the inner side of the seal plate 91, the diaphragm 115 being secured at its outer peripheral edge to a cylindrical attachment bracket 116 carried by the bladder 111 (FIG. 3). Integral with the diaphragm 115 and projecting inwardly therefrom are a central tubular bushing 117, four surrounding bushings 118 and a bushing 119a (FIG. 6), as well as a bushing 119 (FIG. 7). These bushings being respectively disposed for alignment with complementary apertures (not shown) through the center section 92 of the seal plate 91, for a purpose to be explained more fully below.

Integral with the outer surface of the seal plate 91 substantially around the entire perimeter thereof and extending radially outwardly therefrom is a flat annular seal guard 120 which overlies the bladder 111. Formed in the seal guard 120, at spaced-apart points therealong, are a plurality of radially extending circumferentially spaced-apart notches 121 (FIG. 2), in each of which is received a radially-extending stop 122 fixedly secured to the associated section 102 by suitable fasteners. Each of the stops 122 is provided at the distal end thereof with an inclined bearing surface 123 (FIG. 3) disposed for engagement with the frustoconical inner surface 25 of the nozzle 20 to limit the depth of insertion of the nozzle dam 30 therein, as will be explained more fully below. The inner ends of a pair of stops 122 on each side section 102 are spanned by an elongated handle 125 (FIGS. 2 and 3), which is fixedly secured to the stops 122 by suitable fasteners and may be spaced therefrom by standoffs 124.

As indicated above, the center section 92 is provided with a plurality of apertures therethrough, two of which respectively communicate with adapter elbow fittings 130, each having an attachment flange 131 fixedly secured to the outer surface of the center section 92 by suitable threaded fasteners 132. Each of the adapter fittings 130 is coupled to an associated source (not shown) of pressurized fluid, such as compressed air, by a check valve 133 and a quick-disconnect coupling 134. Another of the apertures in the center section 92 communicates with an adapter elbow fitting 135, which also is coupled by a suitable quick-disconnect coupling 136 to the source of compressed air and to a suitable pressure-monitoring instrument (not shown). One of the adapter fittings 130 also communicates at the inner surface of the center section 92, through a fitting 130a, with an inflation conduit 137 (FIGS. 4 and 7) which, in turn, communicates with the inflatable bladder 111 through an inflation aperture therein. Each of the fittings 130, 130a and 135 is provided with a tubular nipple 138 (FIG. 6) which projects into the associated aperture in the center section 92 and is encircled by a sealing O-ring 139.

Referring in particular to FIGS. 3, 6 and 7, interconnection between the inner and outer seal assemblies 40 and 90 is provided by the coupling assembly 140. More specifically, the coupling assembly 140 includes an inner tube 141 provided with an attachment flange 142 fixedly secured to the inner surface of the transverse web 95 of the center section 92 of the inner seal plate 91 by suitable threaded fasteners 143. The tube 141 is provided with a reduced-diameter nipple 144 which projects into the central aperture in the center section 92, being sealed thereto by an encircling O-ring 145.

The coupling assembly 140 also includes an outer tube 146 provided with an attachment flange 147 fixedly secured to the transverse web 45 of the center section 42 of the outer seal plate 41 by threaded fasteners. The tube 146 is also provided with a reduced-diameter nipple 148, receivable in a complementary socket in the transverse web 45 and sealed thereto by an encircling O-ring 149. The tube 146 communicates with an inflation conduit 150 (FIGS. 5 and 6) which, in turn, communicates with the inflatable bladder 71 through an inflation aperture therein.

The tubes 141 and 146 are respectively received through the central bushings 77 and 117 of the diaphragms 75 and 115. Clamps 151 securely seal the bushings 77 and 117 around the outer surfaces of the tubes 141 and 146. The inner ends of the tubes 141 and 146 are respectively connected to the male and female portions of a quick-disconnect coupling 152 for joining the inner and outer ends of the coupling assembly 140. The quick-disconnect coupling 152 is of standard construction, having a male portion receivable in a resiliently retractable female socket portion.

Fixedly secured to the inner tube 141 is a clamp 153 which carries an outwardly extending aligning rod 154, disposed parallel to the axis of the tube 141, and having the distal end thereof disposed to be received in the clevis portion of a clevis clamp 155, which is fixedly secured to the outer tube 146. The two clamps 153 and 155 are also interconnected by a safety rope 156 and clip 157. Fixedly secured to the clamp 153 and projecting therefrom parallel to the aligning rod 154 but on the opposite side of the coupling assembly 140 therefrom, is an elongated slide bar 158.

The quick-disconnect coupling 152 is adapted to be operated by an actuator assembly 160 from the exterior of the nozzle dam 30. More specifically, the actuator assembly 160 includes a collar clamp 161 surrounding and fixedly secured to the retractable female socket portion of the quick-disconnect coupling 152. Integral with the collar clamp 161 and projecting inwardly therefrom and parallel to the axis of the coupling assembly 140 is a bar 162, integral at its inner end with a laterally outwardly extending coupling lug 163. Extending through a complementary bore (not shown) in the coupling lug 163 is one end of a tie rod 164, which is threadedly engaged with a pair of lock nuts 165. The tie rod 164 extends through the bushing 119a in the diaphragm 115, through the aligned aperture in the center section 92 of the inner seal plate 91, and through a fitting 166, the attachment flange 167 of which is fixedly secured to the outer surface of the center section 92. Integral with the outer end of the tie rod 164 is a handle 168 (FIGS. 2 and 6) for manually reciprocating the tie rod 164, thereby to manipulate the retractable female socket portion of the quick-disconnect coupling 152. It will be appreciated that the bushing 119a is securely clamped to the tie rod 164 by one of the clamps 151, the diaphragm 115 being provided with sufficient slack in this region to accommodate the reciprocating movement of the tie rod 164. The slide bar 158 provides a bearing and guiding surface for the bar 162 during reciprocation thereof.

In use, the inner and outer seal assemblies 40 and 90 are also interconnected by the support post assemblies 170, four of which are preferably provided in a rectangular arrangement for interconnecting the center sections 42 and 92 of the seal assemblies 40 and 90. The support post assemblies 170 are substantially identical in construction, wherefore only one will be described in detail.

The support post assembly 170 includes a cylindrical retainer rod 171, provided at one end thereof with an attachment flange 172 for attachment by suitable bolts to one of the coupling blocks 97 of the inner seal assembly 90. The retainer rod 171 projects substantially perpendicular to the center section 92 through an aligned one of the bushings 118 in the diaphragm 115, being clamped thereto by a clamp 151. The retainer rod 171 is provided at its distal end with a retaining socket or recess 173 (FIGS. 6 and 7) which opens to the end and one side of the retainer rod 171.

The support post assembly 170 also includes a cylindrical base rod 175 having an attachment flange 176 which is fixedly secured by suitable fasteners to a corresponding one of the coupling blocks 47 of the outer seal assembly 40. Preferably, each of the rods 171 and 175 is provided with a reduced-diameter nipple 174 which is receivable in a complementary socket 48 in the associated one of the coupling blocks 47 or 97 (see FIG. 6), and may be sealed thereto by an encircling O-ring (not shown). The base rod 175 extends from the center section 42, substantially perpendicular thereto, through an aligned one of the bushings 78 in the diaphragm 75, being clamped thereto by a clamp 151. The base rod 175 is provided at its distal end with a pair of clevis arms 177 cooperating to define therebetween a slot 178.

Receivable in the slot 178 is the flattened tongue 180 of a coupling block 181 which is received in one end of a connecting tube 182. The tongue 180 is adapted for pivotal movement about the axis of a pivot pin 183 which is received through complementary transverse bores in the clevis arms 177. The distal end of the connecting tube 182 is closed by a coupling block 184 providing with an axially projecting stop stud 185. Disposed in surrounding relationship with the connecting tube 182 for free sliding movement longitudinally thereof is a keeper sleeve 187.

In operation, it will be appreciated that the connecting tube 182 is pivotally movable between a release position, inclined to the axes of the rods 171 and 175, illustrated in solid line at the left-hand side of FIG. 7 and in phantom at the right-hand side thereof, and a supporting position, illustrated in FIG. 6, disposed coaxially with the rods 171 and 175. When the connecting tube 182 is disposed in its supporting position, the stop stud 185 is receivable in the retaining recess 173 in the retainer rod 171. In this position, the keeper sleeve 187 can be slid down over the upper end of the base rod 175, the sleeve 187 having a length sufficient to simultaneously encircle both the base rod 175 and a portion of the connecting tube 182, thereby securely to lock the connecting tube 182 in its support position.

Referring to FIG. 7, a monitor tube 190 extends through the bushing 119 of the diaphragm 115, being clamped thereto by one of the clamps 151. The upper end of the monitor tube 190 is received in a bushing fitting 191 fixedly secured to the center section 92 of the seal plate 91 for communication with the adapter fitting 135.

The operation of the nozzle dam 30 will now be described in detail. Initially, the seal assemblies 40 and 90 are disconnected from each other and are separately inserted through the associated manway 19. For this purpose, the support post assemblies 170 are disposed in their release positions, with the connecting tubes 182 overlying the center section 42 of the outer seal assembly 40. The seal plates 41 and 91 are folded in a manner which is described more fully in the aforementioned copending U.S. application Ser. No. 605,354. This folding is facilitated by the cutouts 58 and 108 in the peripheral flanges 57 and 107 of the outer and inner seal assemblies 40 and 90, respectively, the cutouts accommodating flexure of the inflatable bladders 71 and 111 out of the confines of the peripheral flanges 57 and 107. The clip angles 73 and 113 hold the remainder of the bladders 71 and 111 in place.

Once inside the vessel 11, parts of the nozzle dam 30 are assembled to the configuration illustrated in FIG. 3. First of all, the seal plates 41 and 91 are unfolded to their flat sealing conditions, and are latched in this condition by the latch assemblies 65. It will be appreciated that, in this sealing condition, the hinge seals 50 and 100 serve effectively to seal the sections of the seal plates 41 and 91 along the parting planes thereof. Next, the seal assemblies 40 and 90 are joined together. More specifically, the seal assemblies 40 and 90 are then arranged substantially parallel to each other and are rotated until the aligning rod 154 is disposed to be received in the clevis opening of the clevis clamp 155. In this arrangement the tubes 141 and 146 of the coupling assembly 140 will be coaxially aligned as will the retainer rod 171 and the base rod 175 of each of the support post assemblies 170. The two halves of the quick-disconnect coupling 152 are then pressed together for completing the coupling assembly 140, thereby to securely join the seal assemblies 40 and 90 together. The connecting tubes 182 of the support post assemblies 170 are then pivoted to their supporting positions, moving the stop studs 185 into the retaining recesses 173. The clip 157 may then be clipped to the clevis clamp 155. The nozzle dam 30 is now completely assembled and is ready for mounting in the nozzle 20. It will be appreciated that in this assembled condition the coupling assembly 140 forms a conduit providing communication between the inflation conduit 150 and the central one of the adapter fittings 130.

In the mounting operation, a worker grasps the nozzle dam 30 by the handles 125, and inserts it into the nozzle 20 from the inner end thereof, the outer seal assembly 40 being inserted first. The rollers 82 will be disposed for rolling engagement with the frustoconical inner surface 25 of the nozzle 20 for accurately guiding the outer seal assembly 40 into the outer cylindrical portion 22 of the nozzle 20 substantially coaxially therewith. The insertion is continued until the bearing surfaces 123 of the stops 122 engage the frustoconical inner surface 25 of the nozzle 20. When all the stops 122 are firmly in engagement with the frustoconical inner surface 25, the nozzle seal is accurately disposed in its sealing position, with the seal plates 41 and 91 substantially perpendicular to the axis of the nozzle 20.

It is preferable that the inflatable seal 70 be inflated first to prevent creep upon inflation of the inflatable seal 110. Thus, at this point, the adapter fitting 130 which is in communication with the coupling assembly 140 is coupled to the associated source of pressurized air for inflation of the inflatable seal 70 of the outer seal assembly 40. This inflation pushes the seal member 74 radially outwardly into firm sealing engagement with the cylindrical inner surface 23 of the nozzle 20, providing a secure fluid-tight seal around the entire circumference of the seal assembly 40 and also serving firmly to anchor the nozzle dam 30 in place. The seal member 74 cooperates with the diaphragm 75, the hinge seals 50 and the O-rings 139 and 149 to provide an effective fluid-tight seal completely closing the cylindrical portion 22 of the nozzle 20.

Once the outer inflatable seal 70 has been inflated, the other adapter fitting 130 may be coupled to the source of pressurized air, for inflation of the inflatable seal 110. This inflation operates in the same manner as was described above with respect to the seal assembly 40, for effectively sealing the inner seal assembly 90 to the frustoconical portion 24 of the nozzle 20 around the entire circumference thereof. Thus, there is provided a dual seal arrangement, with the seal assembly 90 forming the primary seal and the seal assembly 40 forming a secondary seal.

A significant aspect of the invention is that, in order to facilitate detection of any leaks in the seals formed by the nozzle dam 30, the inter-seal space between the inner and outer seal assemblies 40 and 90 may be pressurized through the monitor tube 190 by coupling the adapter fitting 135 to a source of pressurized fluid, such as air or water. When pressurized to the desired pressure, the monitor tube 190 is then coupled to a suitable monitoring device for monitoring the pressure in the inter-seal space. Any drop in this pressure would indicate a leak in the seals provided by the nozzle dam 30. Additionally, the higher pressure in the inter-seal space will cause any leakage to be out of the seal rather than through it. Suitable cushioning for the diaphragms 75 and 115 may be provided to prevent puncturing thereof or other damage thereto when the inter-seal space is pressurized.

It is an important aspect of the invention that the coupling assembly 140 serves to provide a non-rotatable coupling between the inner and outer seal assemblies 40 and 90. Thus, it will be appreciated that the bolting of the tubes 141 and 146 to the seal plates 41 and 91 prevents rotation of the coupling assembly 140 with respect to the seal plates 41 and 91. This serves to prevent any loosening of the coupling assembly 140 and leakage which might be caused thereby. The engagement of the aligning rod 154 with the clevis clamp 155, as well as the support post assemblies 170, also serve to inhibit any rotation of the seal assemblies 40 and 90 with respect to each other.

It is also important that the support post assemblies 170, by providing a rigid interconnection between the seal assemblies 40 and 90 at a plurality of spaced-apart locations thereon, serve effectively to maintain the seal plates 41 and 91 parallel to each other and coaxial with the nozzle 20. This inhibits any twisting or tilting of the seal plates 41 and 91 and attendant loosening of the peripheral seals thereof, as a result, e.g., of changes in pressure on the opposite sides of the nozzle dam 30.

When it is desired to remove the nozzle dam 30 the inter-seal space is depressurized, and the inflatable seals 70 and 110 are deflated, thereby permitting ready removal of the nozzle dam 30 from the nozzle 20. The coupling assembly 140 may be then easily disconnected by operation of the actuator assembly 160. Thus, the operator pulls on the handle 168 for retracting the female socket portion of the quick-disconnect coupling 152. The seal assemblies 40 and 90 can then be moved axially apart, the retainer rods 171 being movable freely away from the stop studs 185. The support post assemblies 170 can then be unlocked and pivoted to their release positions and the seal assemblies 40 and 90 can be refolded. It will be understood that the actuator assembly 160 also permits independent removal of the inner seal assembly 90, while leaving the outer seal assembly 40 in place, for inspection or maintenance purposes. Also, the U-shape of the retaining recesses 173 permits the support post assemblies 170 to be moved between their release and supporting positions while the seal assemblies 40 and 90 are joined together by the coupling assembly 140.

The seal plates 41 and 91 may be formed of any suitable material having adequate structural strength and corrosion resistance, such as stainless steel. However, in the preferred embodiment of the invention the seal plates 41 and 91 are formed of a lightweight material such as aluminum, with the surfaces thereof which are exposed to wetting being coated with a protective material resistant to the decontamination chemicals, which tend to attack aluminum. The preferred coating material is a polytetrafluoroethylene resin, such as that sold by DuPont under the trademark "TEFLON".

From the foregoing, it can be seen that there has been provided an improved nozzle dam which provides an effective seal of a nuclear steam generator vessel nozzle, by providing dual seals and effectively maintaining them in proper alignment to minimize the chance of leakage.

We claim:

1. A nozzle dam for preventing fluid flow through a primary fluid nozzle in the plenum of a nuclear steam generating vessel, wherein the nozzle has an inner surface and an axis, said nozzle damp comprising: first and second fluid-impermeable seal means disposable in sealing conditions axially spaced-apart within the nozzle and each seal means including an inflatable means, each of said seal means in the sealing condition thereof extending across and closing the nozzle and frictionally engageable with the inner surface thereof around the entire perimeter thereof in a sealing plane to form a fluid-tight seal, means for inflating said inflatable means, coupling means non-rotatably fixed to each of said seal means for interconnecting same in the sealing conditions thereof to maintain a predetermined axial spacing therebetween while inhibiting relative rotation thereof about the axis of the nozzle, said coupling means including disconnection means for separating said first and second seal means from each other, and support means spaced from said coupling means and rigidly interconnecting said first and second seal means for maintaining said sealing planes thereof substantially parallel to each other in a sealing orientation substantially perpendicular to the nozzle axis.

2. The nozzle dam of claim 1, wherein said coupling means is bolted to each of said first and second seal means.

3. The nozzle dam of claim 1 wherein said coupling means includes tubular means providing fluid communication with the inflatable means of one of said seal means.

4. The nozzle dam of claim 1, wherein each of said first and second seal means includes a plurality of sections foldably interconnected to facilitate insertion of the seal means into and removal of the seal means for the plenum of the nuclear steam generating vessel.

5. The nozzle dam of claim 1, and further including means for pressurizing the inter-seal space between said first and second seal means when they are disposed in their sealing conditions.

6. The nozzle dam of claim 1, and further including a polytetrafluoroethylene resin coating on exposed surfaces of each of said first and second seal means.

7. A nozzle dam for preventing fluid flow through a primary fluid nozzle in the plenum of a nuclear steam generating vessel, wherein the nozzle has an inner surface and an axis, said nozzle dam comprising: first and second fluid-impermeable seal means disposable in sealing conditions axially spaced-apart within the nozzle and each seal means including an inflatable means, each of said seal means in the sealing condition thereof extending across and closing the nozzle and frictionally engageable with the inner surface thereof around the entire perimeter thereof in a sealing plane to form a fluid-tight seal, means for inflating said inflatable means, and a plurality of support means rigidly interconnecting said first and second seal means at a plurality of spaced-apart locations thereon for maintaining said sealing planes there of substantially parallel to each other in a sealing orientation substantially perpendicular to the nozzle axis.

8. The nozzle dam claim 7, wherein said support means include a plurality of posts each fixedly secured to each of said first and second seal means.

9. The nozzle dam of claim 8, wherein said support means include four of said posts spaced apart in a substantially rectangular configuration centered about the nozzle axis.

10. The nozzle dam of claim 8, wherein each of said posts includes joint means for effecting separation of said first and second seal means from each other.

11. The nozzle dam of claim 7, wherein each of said first and second seal means includes a plurality of sections foldably interconnected, and each of said support means includes foldable sections, thereby to facilitate insertion of the seal means into and removal of the seal means from the plenum of the nuclear steam generating vessel.

12. The nozzle dam of claim 11, wherein said support means connects one of said sections on said first seal means with the corresponding section on said second seal means.

13. The nozzle dam of claim 7, and further including coupling means non-rotatably fixed to each of said seal means for interconnecting same in the sealing conditions thereof to maintain a predetermined axial spacing therebetween.

14. A nozzle dam for preventing fluid flow through a primary fluid nozzle in the plenum of a nuclear steam generating vessel, wherein the nozzle has an inner surface and an axis, said nozzle dam comprising: first and second fluid-impermeable seal means disposable in sealing conditions axially spaced-apart within the nozzle; and each seal means including an inflatable means each of said seal means in the sealing condition thereof extending across and closing the nozzle and frictionally engageable with the inner surface thereof around the entire perimeter thereof in a sealing plane to form a fluid-tight seal; means for inflating said inflatable means; and a plurality of support means rigidly interconnecting said first and second seal means respectively at a plurality of spaced-apart locations thereon for maintaining said sealing planes thereof substantially parallel to each other in a sealing orientation substantially perpendicular to the nozzle axis, each of said support means including retaining means fixedly secured to said first seal means, connecting means fixedly secured to said second seal means and movable between a support position engageable with said retaining means for retention thereby and a release position out of engagement with said retaining means, and lock means for locking said connecting means in the support position thereof.

15. The nozzle dam of claim 14, wherein each of said connecting means is pivotally movable between the support and release positions thereof.

16. The nozzle dam of claim 15, wherein each of said connecting means includes two cylindrical members arranged coaxially in the support position thereof, said lock means comprising a tubular sleeve coaxially surrounding one of said cylindrical members and slidable longitudinally thereof to a locking position encompassing both of said cylindrical members in the support position thereof for preventing movement thereof from said support position.

17. The nozzle dam of claim 15, wherein each of said retaining means comprises a generally U-shaped bracket dimensioned for receiving the distal end of the pivoting one of said cylindrical members in the support position thereof.

18. The nozzle dam of claim 14, including four of said support means.

* * * * *